(12) United States Patent
Lin et al.

(10) Patent No.: US 8,710,373 B2
(45) Date of Patent: Apr. 29, 2014

(54) BUNDLED FLEXIBLE CABLE WITH WATER RESISTANT STRUCTURE

(75) Inventors: Gwun-Jin Lin, Taoyuan County (TW); Kuo-Fu Su, Taoyuan County (TW); Chih-Heng Chuo, Taoyuan County (TW)

(73) Assignee: Advanced Flexible Circuits Co., Ltd., Taoyuan County (TW)

( * ) Notice: Subject to any disclaimer, the term of this patent is extended or adjusted under 35 U.S.C. 154(b) by 373 days.

(21) Appl. No.: 13/176,121

(22) Filed: Jul. 5, 2011

(65) Prior Publication Data

US 2012/0048597 A1 Mar. 1, 2012

(30) Foreign Application Priority Data

Aug. 26, 2010 (TW) .............................. 99128681 A

(51) Int. Cl.
*H05K 1/00* (2006.01)
(52) U.S. Cl.
USPC ........ 174/254; 174/251; 174/72 C; 174/74 R; 174/77 R
(58) Field of Classification Search
USPC ............. 174/250, 251, 254, 68.1, 68.2, 72 A, 174/71 C, 72 C, 73.1, 74 R, 76, 77 R
See application file for complete search history.

(56) References Cited

U.S. PATENT DOCUMENTS

| 5,641,942 | A * | 6/1997 | Iriyama et al. | ............... | 174/72 A |
| 6,930,252 | B2 * | 8/2005 | Ootsuki | ........ | 174/72 A |
| 8,053,674 | B2 * | 11/2011 | Ooyabu et al. | ................ | 174/254 |

(Continued)

FOREIGN PATENT DOCUMENTS

| CN | 1744382 A | 3/2006 |
| CN | 101681694 A | 3/2010 |
| KR | 10-2010-0007960 A | 1/2010 |

OTHER PUBLICATIONS

Communication From Chinese Patent Office Dated Sep. 14, 2012.

(Continued)

*Primary Examiner* — Hoa C Nguyen
(74) *Attorney, Agent, or Firm* — Rosenberg, Klein & Lee

(57) ABSTRACT

A bundled flexible circuit cable with water resistant structure is provided, in which a flexible substrate forms a cluster section having a lap section. In the lap section, a plurality of flat cable components that collectively form the cluster section is arranged to stack by substantially paralleling each other and corresponding up and down and is bonded and positioned by being applied with an adhesive material. The flat cable components are enclosed by a water resistant component at the lap section, whereby water, liquids, and contaminants are prevented from moving through gaps present in the bundled flexible substrate to get into the enclosure of an electronic device so as to realize protection against water, humidity, and dust. A tubular member or a wrapping member is further provided to fit over a section of the cluster section other than the lap section in order to facilitate extension through a holed mechanism device, such as a hinge, and to improve resistance against flexing and bending. The adhesive material can be a material containing conductive particles therein. Further, the substrate of the flexible circuit cable can be of such a design that a shielding layer is included and in electrical connection with a grounding line, whereby the shielding layer enclosing each of the lapped flat cable components in the water resistant structure is electrically connected to the water resistant component containing a conductive substance or the device enclosure to realize protection against electromagnetic interference.

13 Claims, 7 Drawing Sheets

(56) References Cited

U.S. PATENT DOCUMENTS

| | | | |
|---|---|---|---|
| 2002/0062975 A1* | 5/2002 | Matsunaga | 174/72 A |
| 2003/0006523 A1* | 1/2003 | Suzuki | 264/136 |
| 2006/0042820 A1* | 3/2006 | Lin et al. | 174/117 F |
| 2009/0126993 A1* | 5/2009 | Nishimura et al. | 174/72 A |
| 2013/0126232 A1* | 5/2013 | Sakuma | 174/72 A |

OTHER PUBLICATIONS

Communication From Korean Patent Office Dated Sep. 12, 2012.

* cited by examiner

BUNDLED FLEXIBLE CABLE WITH WATER RESISTANT STRUCTURE

BACKGROUND OF THE INVENTION

1. Field of the Invention

The present invention relates to a water resistant structure of a bundled flexible cable, and in particular to a cluster section included in the flexible circuit cable that comprises at least a lap section, to which a water resistant component is coupled.

2. The Related Arts

A flexible cable has been widely used in various electronic devices, such as a mobile phone, a notebook computer, a digital camera, a camcorder, and a translation device. The conventional structure of a flexible circuit cable arranges a plurality of electrical conductors covered with insulating jackets in a juxtaposing manner to form a flexible circuit cable, which is combined with electrical connectors or circuit soldering to realize transmission of electronic signals. A flexible circuit cable may also be coupled with other components, such as a resistor, a capacitor, an integrated circuit (IC), and an electromagnetic switch.

When a flexible circuit cable is used in an electronic device, no special concern about water resistance must be taken into account. However, for a portable electronic device designed for outdoor use, such as a mobile phone and a digital camera, water resistance or humidity protection becomes a concern. Particularly, in the field of mobile phones, a flexible cable is used to connect between a host device and a display screen of a mobile phone through for example connectors or soldering. If there is no effective water resistant structure between the flexible circuit cable and the host device or the display screen of the mobile phone, water or other liquids, or even contaminants, may flow or move along the flexible circuit cable into the interior of the host device or the display screen of the mobile phone. In the worst condition, shorting may be caused, leading to undesired damage.

Further, when an electronic device is made more and more compact with more and more functions integrated therein, it is getting more and more difficult to extend a flat cable that connects between two electronic components through a structure such as a hinge or a narrow passage. To overcome such a problem, a circuit cable in the form of flexible board, is folded or cut into multiple cable components in a cluster form to thereby form a bundled flexible cable in order to readily extend through a hinge or a narrow passage.

SUMMARY OF THE INVENTION provide proper water resistance for general conventional flexible cable products, most common method in such conventional designs is arranging silicon gel, resin, or a rubber pad as a water resistant component between a shell of an electronic device and a flat cable, whereby water resistance can be effected through a packing relationship between the water resistant component and the shell of the electronic device and the flat cable. However, with respect to a bundled flexible circuit cable that comprises multiple clustered cable components, if a conventional packing rubber pad used as water resistant, water may be still allowed to flow through gaps among the clustered cable components of the bundled flexible circuit cable, and eventually entering the interiors of the host device or display screen of the mobile phone.

Thus, an objective of the present invention is to provide a water resistant for a bundled flexible circuit cable, whereby water, liquids, or contaminants are not allowed to move through gaps among clustered cable components of the bundled flexible circuit cable to enter a shell of an electronic device and resistance against water, liquids, and dust can be realized.

Another objective of the present invention is to provide a bundled flexible circuit cable that shows excellent properties of water resistance and flexing/bending resistance. Being enclosed by a tubular member or a wrapping member, the present invention is made easy in extending through a holed mechanism device, such as a hinge, and improving the resistance against flexing/bending.

To achieve the above objectives, the present invention provides a flexible circuit cable that comprises a flexible substrate forming a cluster section, which comprises a lap section, in which a plurality of flexible cable components that collectively form the cluster section substantially paralleling each other and stacking correspondingly up and down and then bonded and positioned by being applied with an adhesive material. The flexible cable components are enclosed by a water resistant component at the lap section, whereby water, liquids, and contaminants are prevented from moving through gaps present in the bundled flexible substrate to get into the shell or enclosure of an electronic device so as to realize protection against water, humidity, and dust.

A tubular member or a wrapping member is further provided to fit over a section of the cluster section other than the lap section in order to facilitate extension through a holed mechanism device, such as a hinge, and to improve resistance against flexing and bending. The adhesive material can be a material containing conductive particles therein. Further, the substrate of the flexible circuit cable can be of such a design that a shielding layer is included and in electrical connection with a grounding line of the flexible substrate or a main board of the shell, whereby the shielding layer enclosing each of the lapped flexible cable components in the water resistant structure is electrically connected to the water resistant component containing a conductive substance or the device enclosure to realize protection against electromagnetic interference.

In a preferred embodiment of the present invention, the water resistant component is made of a material that comprises an insulation material, or a material having electrical conductivity. In different applications, through selection of the materials, effects of insulating, electrical conductivity, or magnetism resistance may achieve. When the water resistant component is made of a material having electrical conductivity, the water resistant component may connect the metal shielding layer of the flexible circuit cable with a potentially used metal enclosure to realize improved protection against electromagnetic interference.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 1:
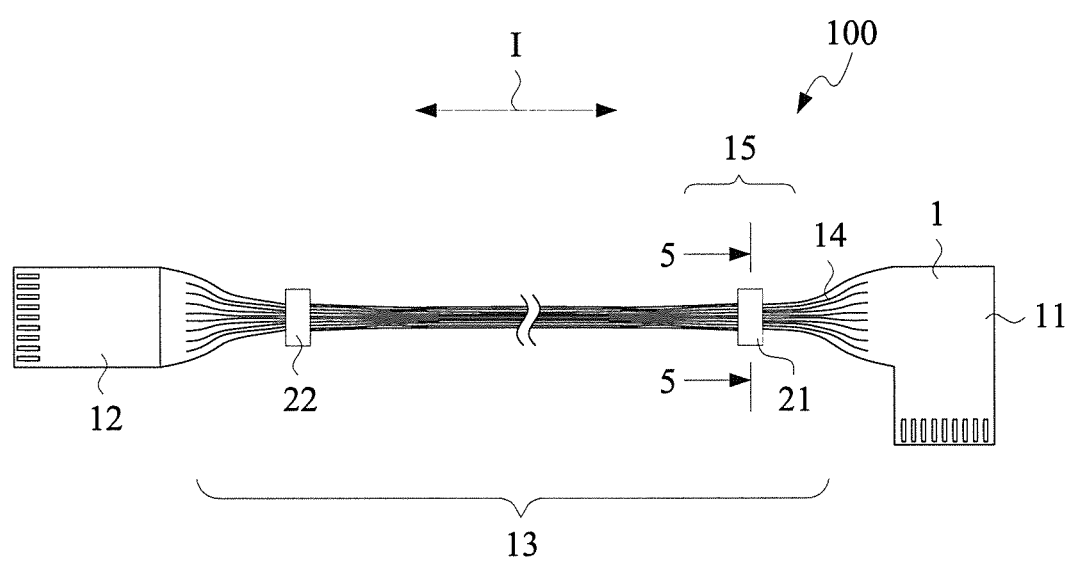
FIG. 1 is a schematic view showing a bundled flexible circuit cable in accordance with an embodiment the present invention.

With reference to the drawings and in particular to FIG. 1, which shows a schematic view of a bundled flexible circuit cable with water resistant structure according to the present invention, the bundled flexible circuit cable of the present invention, generally designated at 100, comprises a flexible substrate 1, which extends in an extension direction I and has a first end 11 and a second end 12, which can be constructed in various forms, such as a plugging end, a socket, a soldered end, and an open end, as desired.

The flexible substrate 1 has a middle section or a selected section that is constructed to comprise at least one cluster section 13. The cluster section 13 is composed of a plurality of clustered flexible cable components 14 that is formed by slitting the flexible substrate 1 in the extension direction I. And, the flexible cable components 14 are bundled to form a bundled arrangement. A lap section 15 is formed at a selected location of the cluster section 13 or at a section that covers at least a portion of the cluster section 13. A water resistant component 21, 22 is mounted to the lap section 15. For example, in the embodiment illustrated, a water resistant component 21, 22 is mounted to each of two end portions of the cluster section 13 that are adjacent to the first end 11 and the second end 12.

Figure 2:
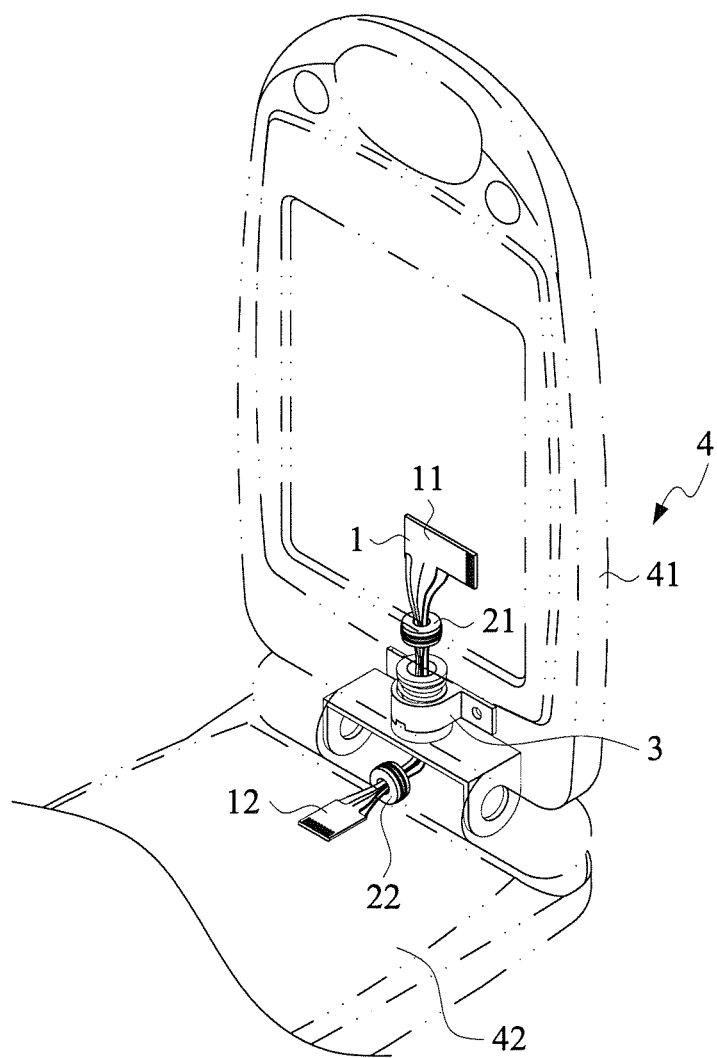
FIG. 2 is a schematic view showing the bundled flexible circuit cable according to the present invention coupled to a mobile phone.

In a practical application, the flexible substrate 1 can be used as an independent component to be mounted in an electronic device or can be set through a hinge structure 3 to connect two electronic components. An example is shown in FIG. 2, where the present invention is applied to an electronic device 4, such as a mobile phone, so that the flexible substrate 1 is positioned through a hollow portion formed in a hinge structure 3 of the electronic device 4 to have the first end 11 of the flexible substrate 1 connected to a first component 41 of the electronic device 4 (such as a display screen of the mobile phone) and the second end 12 of the flexible substrate 1 connected to a second component 42 of the electronic device 4 (such as a host device of the mobile phone).

Figure 3:
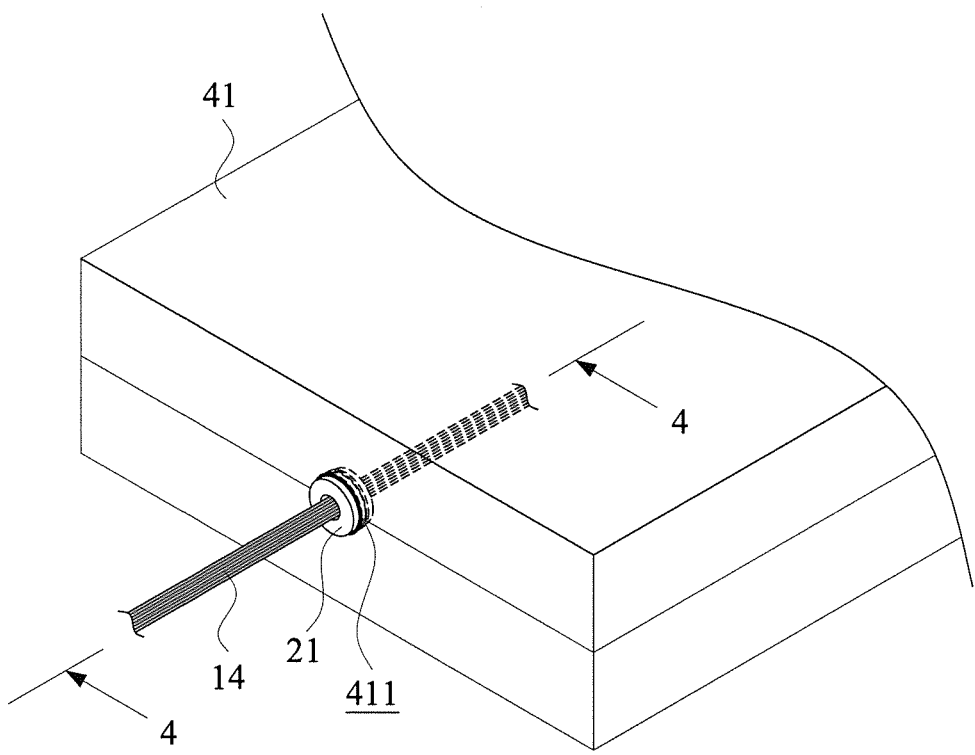
FIG. 3 is a perspective view showing the bundled flexible circuit cable according to the present invention set in an opening formed in an electronic device.
Figure 4:
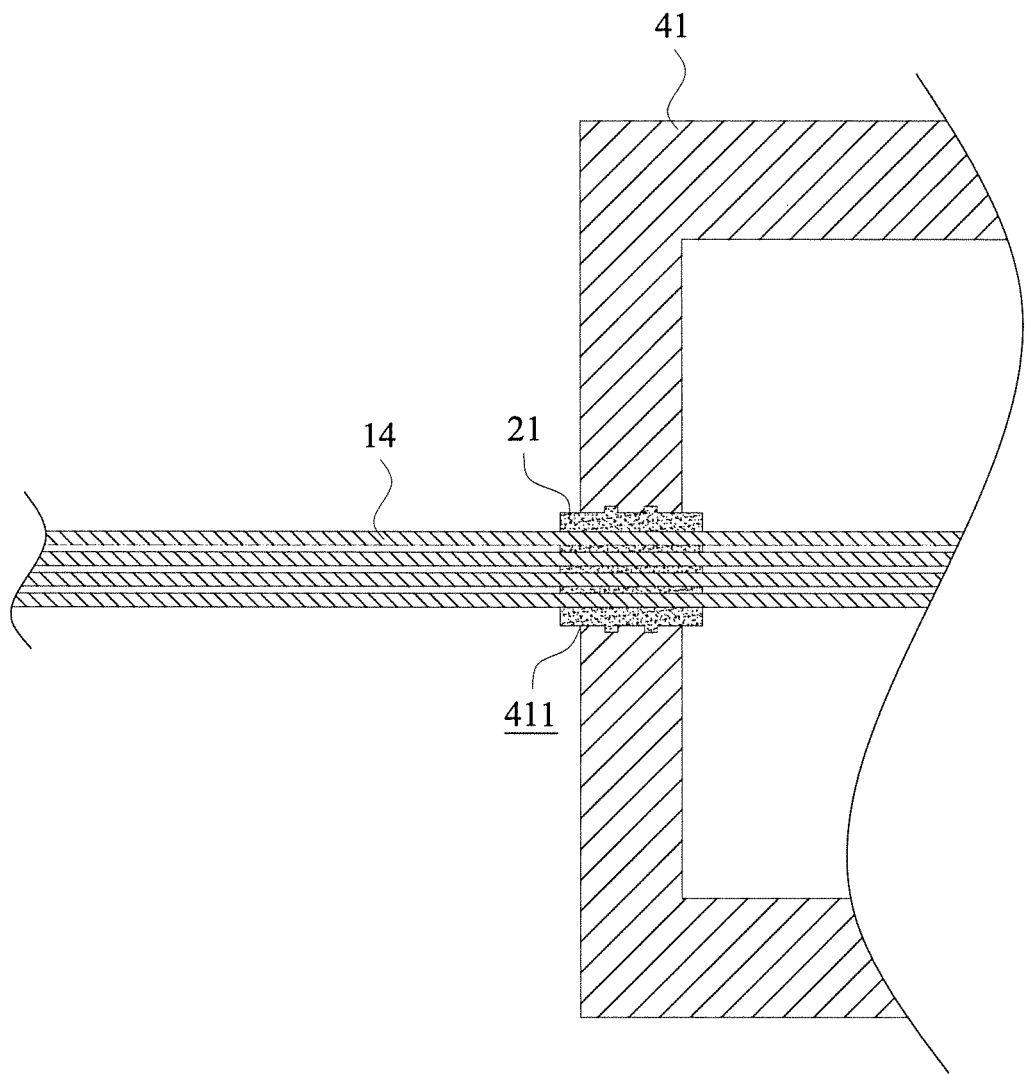
FIG. 4 is a cross-sectional view showing the bundled flexible circuit cable according to the present invention set in the opening formed in the electronic device.

The water resistant component (taking the first water resistant component 21 as an example for description) can be structured to mate an opening 411 formed in the first component 41 of the electronic device 4 (see FIGS. 3 and 4) to prevent water, liquids, and contaminants from moving along gaps in the bundled flexible substrate into the interior of the first component 41 of the electronic device 4 so as to realize protection against water, humidity, and dust.

Figure 5:
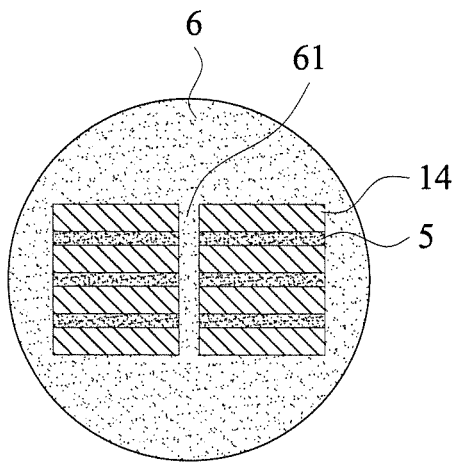
FIG. 5 is a cross-sectional view taken along line 5-5 of FIG. 1.

FIG. 5 shows a cross-sectional view taken along line 5-5 of FIG. 1. The portions of the flexible cable components 14 that are located within the lap section 15 of the flexible substrate 1 are arranged substantially paralleling each other and stacking correspondingly up and down and an adhesive material 5 is applied between adjacent ones of the flexible cable components for bonding and positioning. A water resistant molded material 6 is then formed through a molding operation for enclosing purposes. The water resistant molded material 6 is molded to combine with the flexible cable components 14 so that the water resistant molded material 6 is allowed to partially fill into gaps between adjacent flexible cable components 14 to form a filled portion 61. Alternatively, among stacked layers of flexible cable components, the adhesive material 5 may be applied in such a way to cross multiple stacked flexible cable components and then subject to positioning and pressing, and afterwards, the water resistant molded material 6 is molded for covering.

The water resistant component can be made of an insulation material, such as silicon rubber, rubber, silicon gel, plastic, or resin. The water resistant component may alternatively be made of a conductive material, such as silicon rubber, rubber, silicon gel, plastic, and resin containing conductive particles (such as graphite, silver, and nickel) therein. Through selection made among these materials, conductivity and magnetism resistance can be selectively realized.

The adhesive material 5 can be an insulation material, such as hot pressure adhesive, pressure sensitive adhesive, silicon rubber, rubber, silicon gel, plastic, or resin. Alternatively, the adhesive material 5 can be a conductive material, such as silicon rubber, rubber, silicon gel, plastic, and resin containing conductive particles (such as graphite, silver, and nickel) therein. Through selection made among these materials, conductivity and magnetism resistance can be selectively realized.

Figure 6:
FIG. 6 is an enlarged cross-sectional view showing one flexible cable component illustrated in FIG. 5.

The flexible cable components 14 of the flexible substrate can be simply of a form of substrate 141 (see FIG. 6). Or alternatively, a shielding layer 142 may be formed a surface of the substrate 141 with the shielding layer being in connection with a grounding line of the flexible substrate or a main board of the shell, whereby the shielding layer enclosing each of the lapped flexible cable components in the water resistant structure is electrically connected to the water resistant component containing a conductive substance or the device enclosure to realize protection against electromagnetic interference. Further, an insulation layer 143 may be formed on a surface of the shielding layer 142.

The bundled flexible circuit cable having the above descried structure comprises water resistant components 21, 22 and an adhesive material 5 and filled portions 61 are formed among the flexible cable components 14, whereby a closed water resistant structure is formed, which provides effective water protection.

Figure 7:
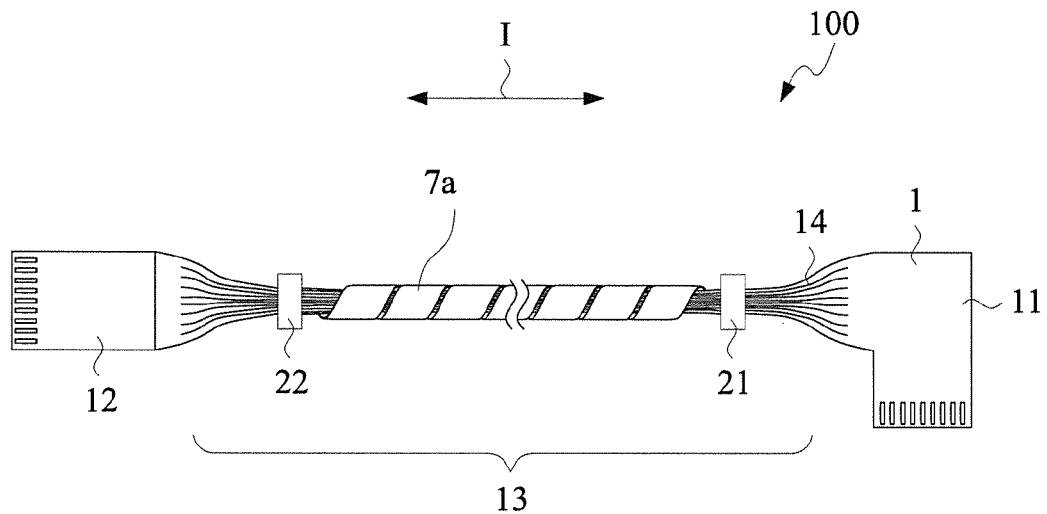
FIG. 7 is a schematic view showing a helical wrapping member that is fit over a section of the bundled flexible circuit cable according to the present invention other than a lap section in such a manner as being slidable with respect to the flexible cable components.

After being combined with the water resistant components, the bundled flexible cable according to the present invention can be further provided with a helical wrapping member 7a (see FIG. 7) that is fit over a section of the flexible cable other than the lap section 15 in such a manner as being capable of sliding with respect to the flexible cable components 14.

Figure 8:
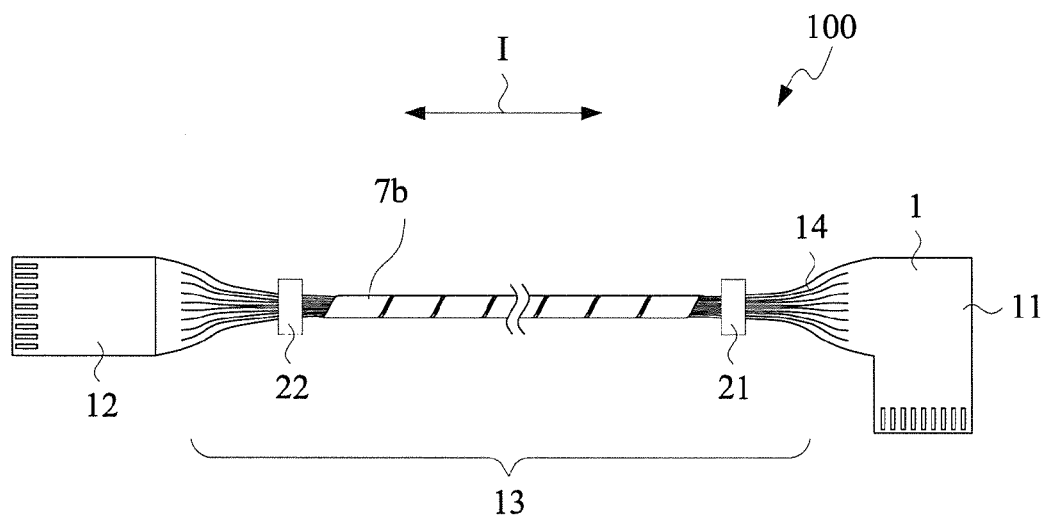
FIG. 8 is a schematic view showing a helical wrapping member that is fit over a section of the bundled flexible circuit cable according to the present invention other than a lap section in such a manner as being in close contact with the bundled flexible circuit cable.

Alternatively, a helical wrapping member 7b (see FIG. 8) that is in close contact with the bundled flexible circuit cable can be provided over a section of the cable other than the lap section 15.

Figure 10:
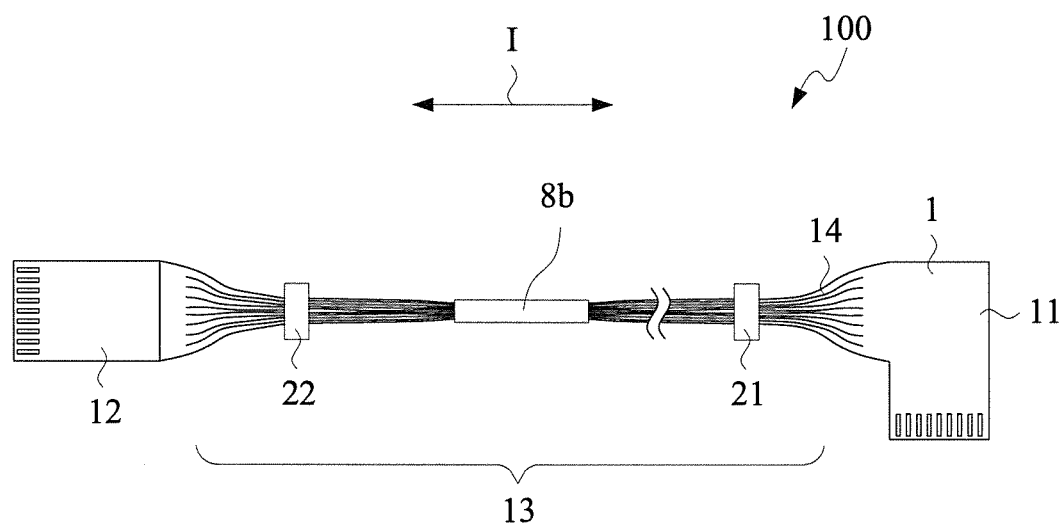
FIG. 10 is a schematic view showing a tubular member that is fit over a section of the bundled flexible circuit cable according to the present invention other than a lap section in such a manner that the tubular member is in close contact with the bundled flexible circuit cable.
Figure 9:
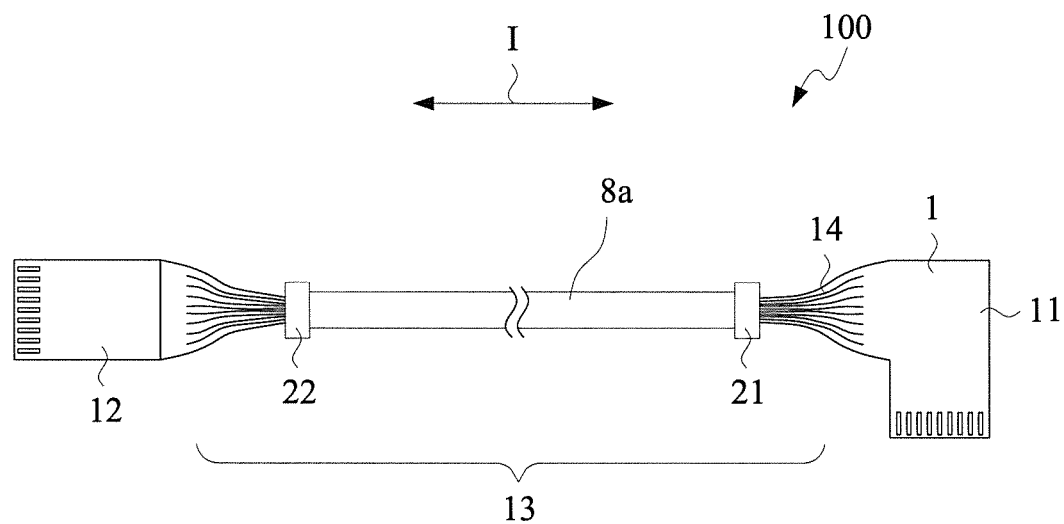
FIG. 9 is a schematic view showing a tubular member that is fit over a section of the bundled flexible circuit cable according to the present invention other than a lap section in such a manner that a gap exists between the tubular member and the bundled flexible circuit cable.

Alternatively, after being combined with the water resistant components, the bundled flexible cable according to the present invention can be further provided with a tubular member 8a (see FIG. 9) that is fit over a section of the flexible cable other than the lap section 15 in such a manner that a gap exists between the tubular member and the bundled flexible cable 14. Alternatively, a tubular member 8b (see FIG. 10) that is in close contact with the bundled flexible cable can be provided over a section of the cable other than the lap section 15.

The arrangement of the wrapping member or the tubular member is aimed to improve flexing/bending resistance of the bundled flexible cable in the extension of the bundled flexible cable through a holed mechanism device, such as hinge.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A bundled flexible cable with water resistant structure, comprising:
    a flexible substrate having a first end and a second end; and
    at least one cluster section extending intermediately between the first and second ends in an extension direction, the cluster section including a plurality of flexible cable components formed by separably slit portions of the flexible substrate extending between the first and second ends in the extension direction;
    the cluster section defining an intermediate portion wherein the flexible cable components are bunched together and at least one lap section wherein the flexible cable components are transitioned to a stacked arrangement with at least one flexible cable component being disposed substantially parallel over at least one other; and
    a water resistant component coupled to the flexible cable components at each lap section, the water resistant component including a water resistant molded material enveloping the flexible cable components in the lap section, the water resistant molded material including a fixing portion passing transversely through the stacked arrangement of flexible cable components.

2. The bundled flexible cable with water resistant structure as claimed in claim 1, wherein the flexible substrate has a surface on which a shielding layer is formed, the water resistant component enclosing the lap section of the flexible cable components that comprise the shielding layer.

3. The bundled flexible cable with water resistant structure as claimed in claim 2, wherein the shielding layer has a surface on which an insulation layer is formed.

4. The bundled flexible cable with water resistant structure as claimed in claim 1, wherein the flexible cable components in the lap section are bonded and positioned by being applied with an adhesive material, and then enclosed by the water resistant component.

5. The bundled flexible cable with water resistant structure as claimed in claim 4, wherein the adhesive material comprises an insulation material that comprises one of hot pressure adhesive, pressure sensitive adhesive, silicon rubber, rubber, silicon gel, plastic, or resin.

6. The bundled flexible cable with water resistant structure as claimed in claim 4, wherein the adhesive material comprises a conductive material that comprises one of hot pressure adhesive, pressure sensitive adhesive, silicon rubber, rubber, silicon gel, plastic, or resin that contains conductive particles therein.

7. The bundled flexible cable with water resistant structure as claimed in claim 4, wherein the water resistant component is made of an insulation material that comprises one of silicon rubber, rubber, silicon gel, plastic, or resin.

8. The bundled flexible cable with water resistant structure as claimed in claim 4, wherein the water resistant component is made of a conductive material that comprises one of silicon rubber, rubber, silicon gel, plastic, or resin that contains conductive particles therein.

9. The bundled flexible cable with water resistant structure as claimed in claim 1 further comprising a tubular member that is fit over a section of the cluster section other than the lap section in such a way that a gap is present between the tubular member and the bundled flexible circuit cable.

10. The bundled flexible cable with water resistant structure as claimed in claim 1 further comprising a wrapping member that is fit over a section of the cluster section other than the lap section in such a way that the wrapping member is capable of sliding with respect to the flexible cable components.

11. The bundled flexible cable with water resistant structure as claimed in claim 1 further comprising a wrapping member that is fit over a section of the cluster section other than the lap section in such a way that the wrapping member is in close contact with the bundled flexible circuit cable.

12. The bundled flexible cable with water resistant structure as claimed in claim 1, wherein the flexible cable components are arranged to extend through a hinge structure of an electronic device.

13. A bundled flexible cable with water resistant structure, comprising:
    a flexible substrate having a first end and a second end; and
    at least one cluster section extending intermediately between the first and second ends in an extension direction, the cluster section including a plurality of flexible cable components formed by separably slit portions of the flexible substrate extending between the first and second ends in the extension direction;
    the cluster section defining an intermediate portion wherein the flexible cable components are bunched together and at least one lap section wherein the flexible cable components are transitioned in arrangement to fan out at one of the first and second flexible substrate ends, the flexible cable components at the lap section forming a stacked arrangement with at least one flexible cable component being disposed substantially in parallel over at least one other; and
    a water resistant component comprising a water resistant molded material enveloping the flexible cable components at the lap section;
    wherein the flexible substrate is covered by a shielding layer formed thereon, the water resistant component enveloping the lap section of the flexible cable components having the shielding layer; and,
    wherein the flexible cable components in the lap section are bonded and positioned by an adhesive material, the bonded flexible cable components being enveloped by the water resistant component.

* * * * *